(12) United States Patent
Yamamoto et al.

(10) Patent No.: US 7,003,926 B2
(45) Date of Patent: Feb. 28, 2006

(54) STRIP TAPE MOUNTING DEVICE AND BAG MANUFACTURING AND PACKAGING APPARATUS HAVING THE SAME

(75) Inventors: Akira Yamamoto, Ritto (JP); Yoshio Iwasaki, Ritto (JP); Yukio Kakita, Ritto (JP)

(73) Assignee: Ishida Co., Ltd., Kyoto (JP)

(*) Notice: Subject to any disclaimer, the term of this patent is extended or adjusted under 35 U.S.C. 154(b) by 0 days.

(21) Appl. No.: 10/852,252

(22) Filed: May 25, 2004

(65) Prior Publication Data

US 2004/0255554 A1 Dec. 23, 2004

(30) Foreign Application Priority Data

Jun. 19, 2003 (JP) .............................. 2003-174366

(51) Int. Cl.
*B65B 61/00* (2006.01)

(52) U.S. Cl. .................... 53/136.1; 53/591; 156/265

(58) Field of Classification Search ............... 53/136.1, 53/555, 591; 156/265, 302, 555; 493/380, 493/478

See application file for complete search history.

(56) References Cited

U.S. PATENT DOCUMENTS

| | | | | |
|---|---|---|---|---|
| 3,864,895 A | * | 2/1975 | Petrea | 156/556 |
| 4,003,782 A | * | 1/1977 | Farrelly | 156/552 |
| 4,498,895 A | * | 2/1985 | White | 493/478 |
| 4,765,117 A | * | 8/1988 | Akutsu et al. | 493/380 |
| 5,072,573 A | * | 12/1991 | Tisma | 493/474 |
| 6,726,794 B1 | * | 4/2004 | Belt | 156/302 |

FOREIGN PATENT DOCUMENTS

| | | |
|---|---|---|
| JP | 4-242522 A | 8/1992 |
| JP | 9-508879 A | 9/1997 |
| WO | WO-98/52823 A | 11/1998 |

* cited by examiner

*Primary Examiner*—John Sipos
(74) *Attorney, Agent, or Firm*—Shinjyu Global IP Counselors, LLP

(57) ABSTRACT

The present invention provides a strip tape mounting device that stabilizes an upper portion of a bag that will be attached to a strip tape, while preventing the bag from being crushed. The strip tape mounting device of the present invention includes an attaching mechanism that attaches an attachment portion of a bag to the strip tape by compression, the bag being manufactured by a bag manufacturing unit that manufactures bags that are filled with articles. The strip tape mounting device also includes a transfer unit that holds the bag below the attachment portion of the bag and transports the bag to the attaching mechanism, and a retaining plate that supports the bag so that the bag is supported in a predetermined posture.

20 Claims, 10 Drawing Sheets

STRIP TAPE MOUNTING DEVICE AND BAG MANUFACTURING AND PACKAGING APPARATUS HAVING THE SAME

BACKGROUND OF THE INVENTION

1. Field of the Invention

The present invention generally relates to a strip tape mounting device. More specifically, the present invention relates to a strip tape mounting device that mounts bags onto a strip by applying pressure to the bags while holding the bags, the bags being formed by sealing a belt-shaped film and filling articles such as potato chips and the like.

2. Background Information

Strip bags have been commonly used in which bags of a snack food such as potato chips or the like are adhered to a predetermined number of strips at a predetermined spacing and displayed with the bags hanging downward. Such strip bags are designed to allow a customer to pull a snack food bag from the strip so that the food bag is removed from the strip. Devices which manufacture this type of strip bags by automatically manufacturing bags whose interiors are filled with articles and then subsequently applying pressure and adhering the bags to a strip that is drawn out are well known (see for example Japanese Published Patent Application No. H09-508879, U.S. Pat. No. 3,864,895, and International Patent Application Publication No. 98/52823).

The applicants have also developed a device which includes a bag manufacturing unit, an attaching unit, and a transfer unit. The bag manufacturing unit forms a belt-shaped film into a tubular shape, and manufactures bags whose interiors are filled with articles such as potato chips and the like. The attaching unit applies pressure and adheres the bags to a strip that is fed out from a feed roller. The transfer unit includes a pair of arms that are left-right symmetrical, and moves bags manufactured by the bag manufacturing unit to the attaching unit.

More specifically, the bag manufacturing unit forms a belt-shaped film into a tubular body which extends in a longitudinal direction and whose lower portion and side surface are sealed. Then, after the bag manufacturing unit drops articles in the tubular body from above, the upper portion of the bag is sealed by a heat sealing mechanism and cut from the belt-shaped film. Grasping members that serve to grasp the side portions of the bag are provided on the upper portion of the arms of the transfer unit. Before a manufactured bag is cut off from the belt-shaped film, the grasping members will grasp both the left and right sides of the bag. The transfer unit operates while the bag is grasped by the grasping member, and transfers the bag from the bag manufacturing unit to the attaching unit.

The attaching unit includes a heater that is heated to a high temperature, and a clamp that is pushed and compressed onto the heater. Then, the attaching unit presses and adheres together, with the heater and the compression surface of the clamp, a strip that is drawn out onto the heater, and an upper portion of the bag that is placed on top of the strip by the transfer unit. After that, the transfer unit will return to the bag manufacturing unit in order to grasp a newly manufactured bag, and the clamp in the attaching unit will be opened, a new strip will be drawn out, and the same operation will be repeated.

However, if a bag of snack food is gripped tightly with a large gripping member so that the bag will not move, the articles inside the bags may be crushed, and the gas sealed in the bags in order to preserve the articles may be compressed and thus the bags may break open. Accordingly, a smaller sized gripping member has been adopted, and the gripping force set to a lower level.

However, if the gripping member and the gripping force are as described above, a phenomenon will occur in which the upper portion of the bag that is above the gripping portion will move when the lower portion of the bag swings due to the inertial force produced when the bag is transferred to the attaching unit. The effect of this is that problems will occur such as the upper portion of the bag not being placed on the desired position of the strip and thus the positions in which the bags are adhered to the strip not being uniform, or the clamp interfering with the upper end of the bag and thus the bag being adhered to the strip tape in a shape in which the upper end thereof is crushed.

In view of the above, it will be apparent to those skilled in the art from this disclosure that there exists a need for an improved a strip tape device that overcomes the aforementioned problems in the prior art. This invention addresses this need in the art as well as other needs, which will become apparent to those skilled in the art from this disclosure.

SUMMARY OF THE INVENTION

It is an object of the present invention to provide a strip tape mounting device that will control movement of an upper portion of a bag that will become the portion to be attached to the strip tape, and will stabilize the attaching position of the bag with respect to the strip tape.

A strip tape mounting device according to a first aspect of the present invention includes an attaching mechanism, a transfer mechanism, and a retaining member. The attaching mechanism attaches to the strip tape by compression an attachment portion of the bag that is filled with articles. The transfer mechanism receives the bag and transfers the bag to the attaching mechanism while holding the bag at a portion below the attachment portion. The retaining member supports the bag to allow the bag to be transferred to the attaching mechanism in a predetermined posture.

Because the first invention includes a retaining member that supports a bag that is held by the transfer mechanism in a predetermined posture, swinging of the bag is suppressed and unnecessary movement of the upper portion of the bag including the attachment portion can be reduced. As a result, problems such as misalignment of the attachment position of the bag with respect to the strip tape, or the clamp interfering with the upper end of the bag can be reduced.

A strip tape mounting device according to a second aspect of the present invention is the strip tape mounting device of the first aspect of the present invention, in which the retaining member is disposed on a side of the attaching mechanism, and supports the bag in the predetermined posture when the bag is transferred to the attaching mechanism.

According to the second aspect of the present invention, the structure in the vicinity of the transfer mechanism can be simplified because the retaining mechanism is disposed on the attaching mechanism rather than on the transfer mechanism.

A strip tape mounting device according to a third aspect of the present invention is the strip tape mounting device of the first or second aspect of the present invention, in which the retaining member is disposed below the attaching mechanism, and supports the bag at a side portion that is below where the transfer mechanism holds the bag.

According to the third aspect of the present invention, swinging of the lower portion of a bag that is primarily caused by the movement of the attaching portion of the bag can be more reliably suppressed by supporting the bag at its side portion that is below where the transfer mechanism holds the bag.

A strip tape mounting device according to a fourth aspect of the present invention is the strip tape mounting device of any of the first through third aspects of the present invention, in which the retaining member supports the bag by supporting a bag that has already been attached to the strip tape.

According to the fourth aspect of the present invention, the strip tape mounting device can be constructed at a low cost because a bag can be supported in a predetermined posture by simply supporting the bag that has already been attached to the strip tape and thereby indirectly supporting the bag that is to be attached to the strip tape.

A strip tape mounting device according to a fifth aspect of the present invention is the strip tape mounting device of any of the first through fourth aspects of the present invention, in which the retaining member is at an angle of inclination that corresponds to a discharge direction of the strip of bags.

According to the fifth aspect of the present invention, bags can be more smoothly discharged because the retaining member is inclined to correspond to the discharge direction of the strip of bags.

A strip tape mounting device according to a sixth aspect of the present invention is the strip tape mounting device of the fifth aspect of the present invention, in which the retaining member has a support portion that supports the bag at its side portion, and the support portion as a trough shape that extends in the discharge direction of the strip of bags.

According to the sixth aspect of the present invention, it will be easy to center the bag within the retaining member because the support portion is formed into a trough shape, and the bags can be more smoothly discharged.

A strip tape mounting device according to a seventh aspect of the present invention is the strip tape mounting device of the sixth aspect of the present invention, in which the retaining member further includes wall shaped guide that interpose the support portion from both sides.

According to the seventh aspect of the present invention, the bags can be reliably centered within the retaining member due to the wall shaped guides, and the bags can be more smoothly discharged.

A strip tape mounting device according to an eighth aspect of the present invention is the strip tape mounting device of the sixth aspect of the present invention, in which the retaining member further includes side plates that are slidably coupled to the support portion, such that a width of the retaining member is adjustable.

According to the eighth aspect of the present invention, various sizes of bags can be accommodated because the width and/or the length of the support portion can be adjusted.

A strip tape mounting device according to a ninth aspect of the present invention is the strip tape mounting device of any of the first through eighth aspects of the present invention, in which the retaining member is supported via a hinge such that the angle of inclination of the retaining member is adjustable.

According to the ninth invention, various sizes of bags can be accommodated and the discharge direction of the bags can be changed because the angle of inclination of the support portion can be adjusted.

A strip tape mounting device according to a tenth aspect of the present invention is the strip tape mounting device of any of the first through ninth aspects of the present invention, in which the retaining member includes an upper plate and a lower plate, the lower plate being slidably coupled to the upper plate such that a length of the retaining member is adjustable in a discharge direction of the strip of bags.

A strip tape mounting device according to an eleventh aspect of the present invention is the strip tape mounting device of any of the first through tenth aspects of the present invention, in which the retaining member is disposed on the transfer unit.

A bag manufacturing and packaging apparatus according to a twelfth aspect of the present invention includes a bag manufacturing unit that manufactures bags that are filled with articles, and the strip tape mounting device disclosed in any of the first through eleventh aspect of the present invention. The strip tape mounting device mounts bags manufactured by the bag manufacturing unit onto the strip tape.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Embodiments of the present invention will be described below with reference to the figures.

Figure 1:
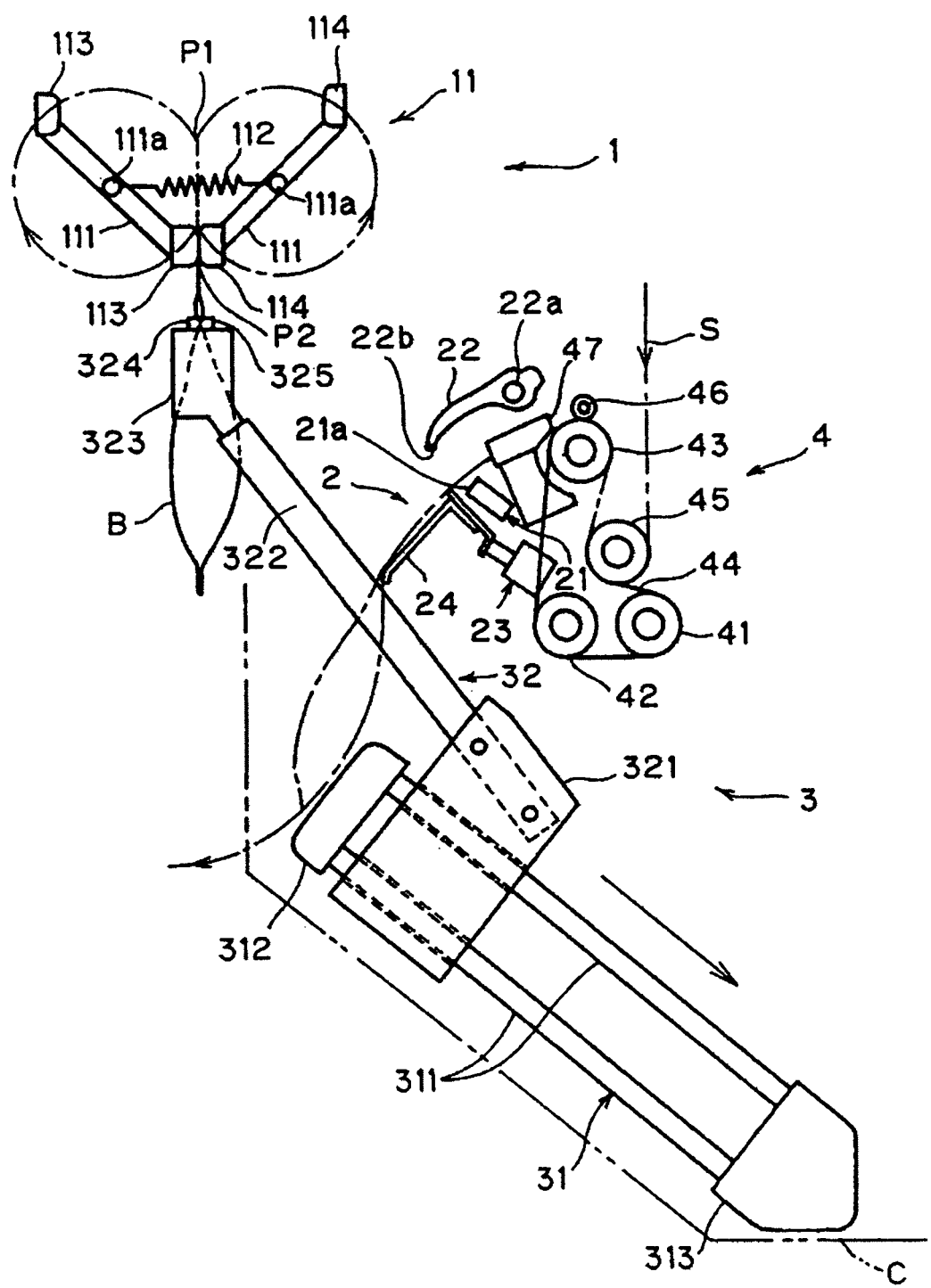
FIG. 1 shows a bag manufacturing and packaging apparatus that includes a strip tape mounting device in accordance with an embodiment of the present invention, showing a bag manufactured by a bag manufacturing unit and received by a transfer unit.
Figure 2:
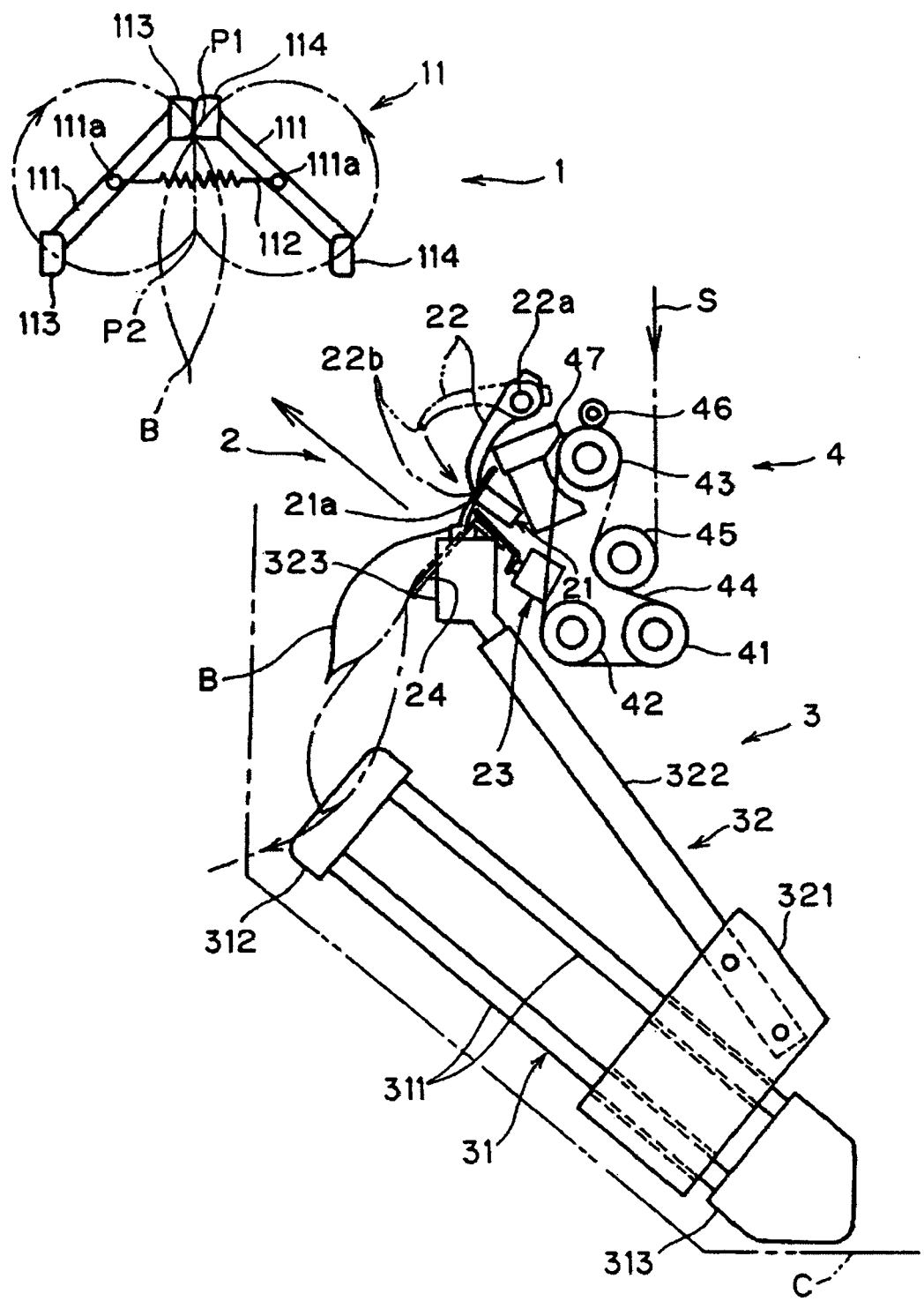
FIG. 2 shows a bag being attached to a strip by an attaching unit in accordance with the embodiment of the present invention.
Figure 3:
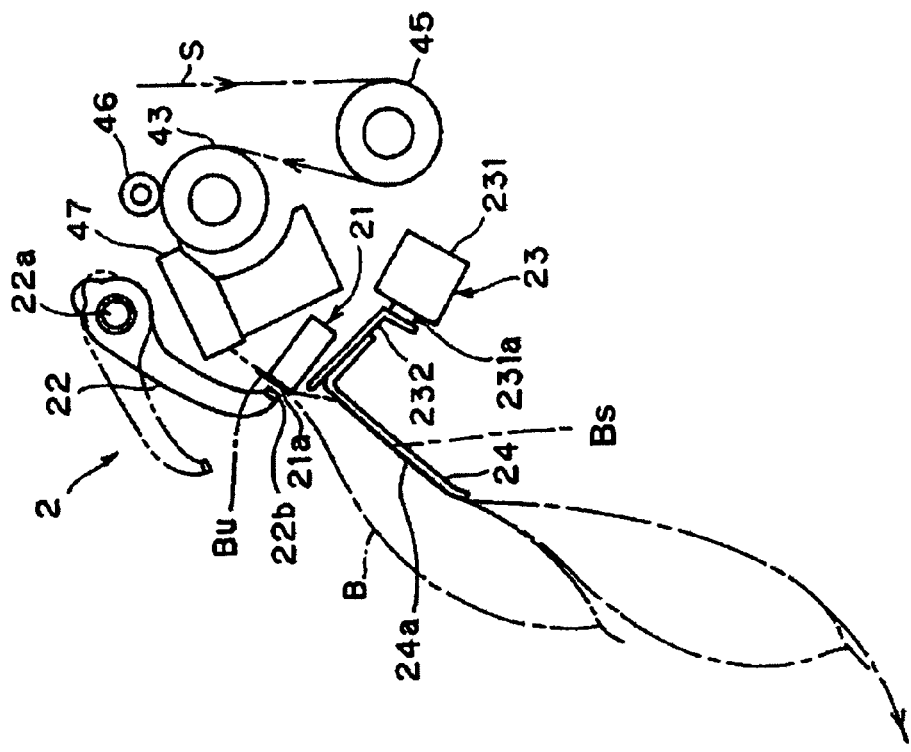
FIG. 3 show partial enlarged views of the attaching unit in accordance with an embodiment of the present invention, in which FIG. 3($a$) corresponds to FIG. 1 and FIG. 3($b$) corresponds to FIG. 2.
Figure 3:
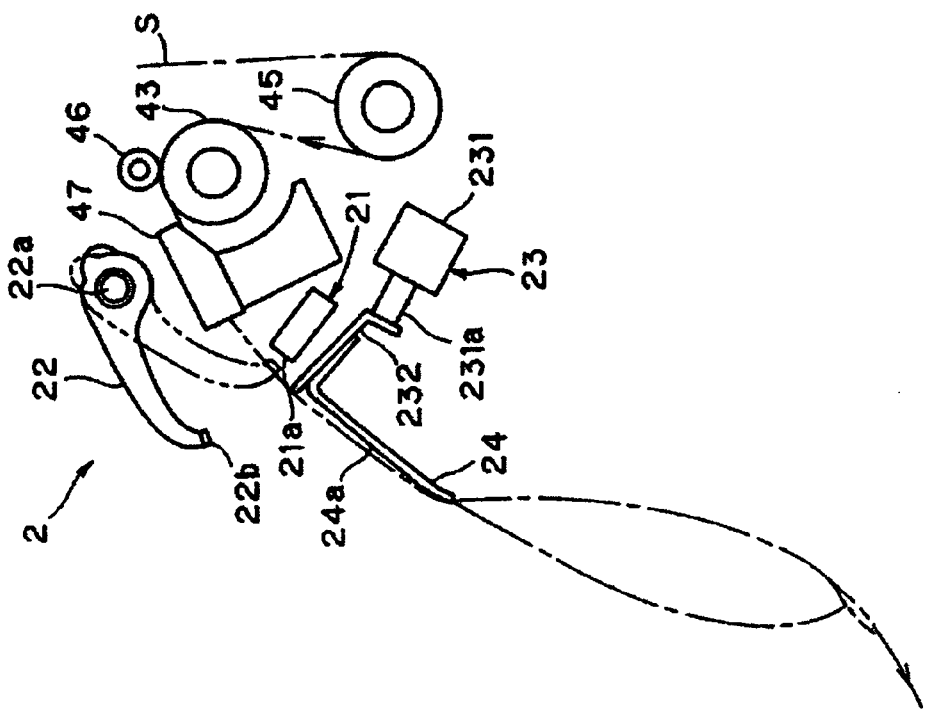
Figure 4:
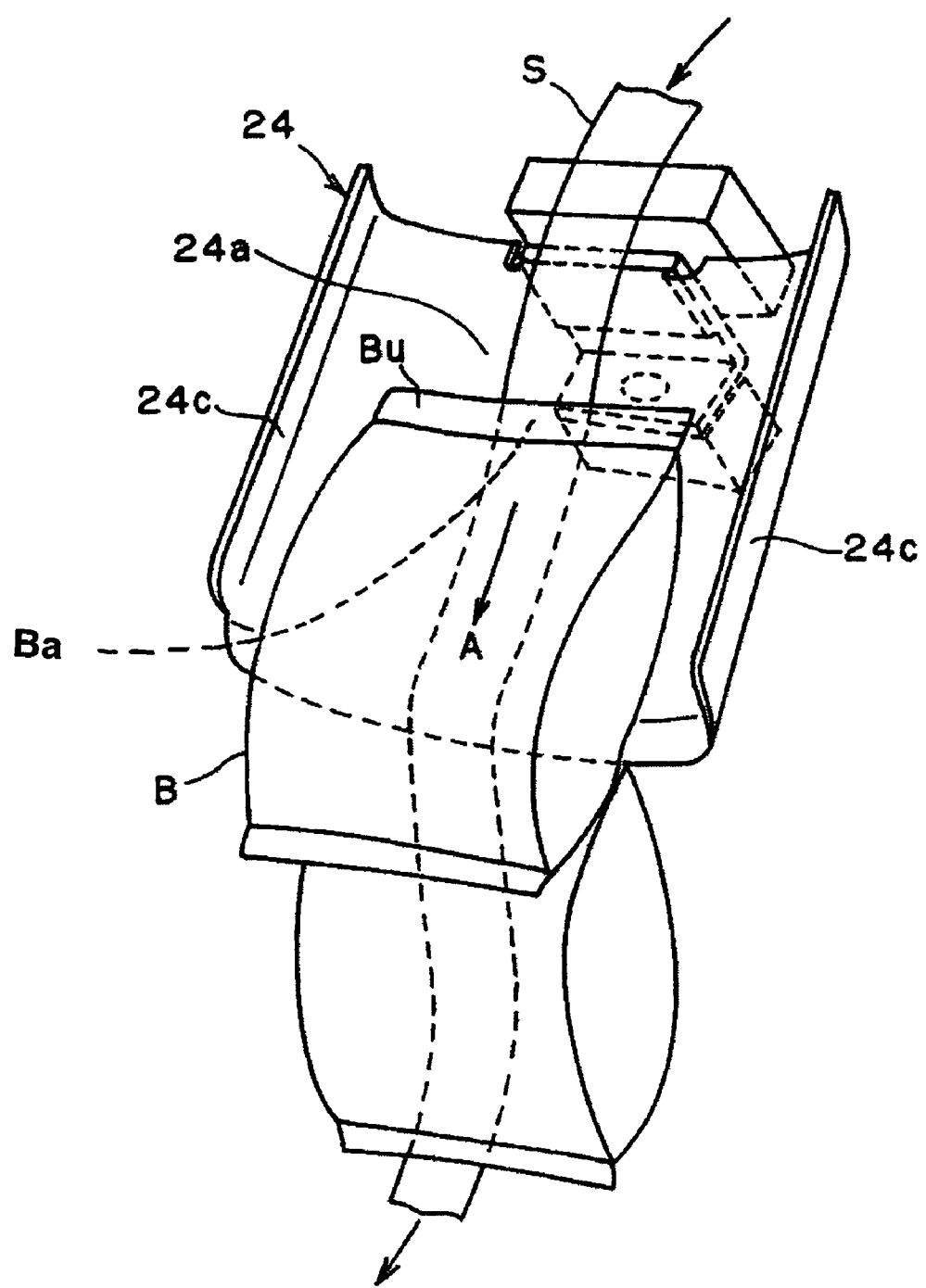
FIG. 4 shows a perspective view of the area around a retaining plate of the strip tape mounting device in accordance with the embodiment of the present invention.
Figure 5:
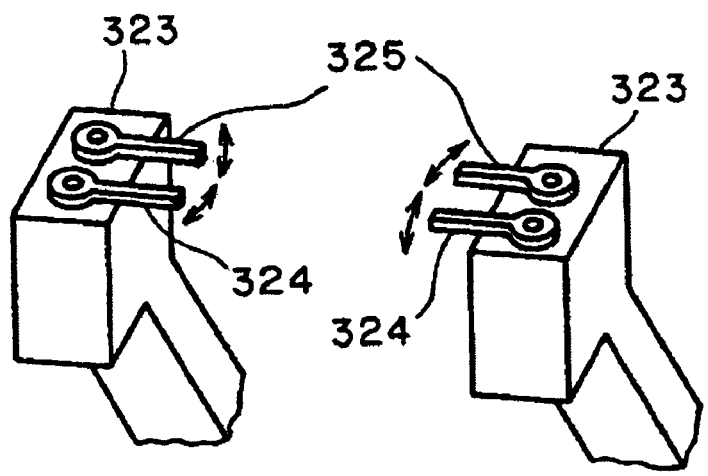
FIG. 5 show perspective views of grasping members that are included in the transfer unit in accordance with the embodiment of the present invention.
Figure 5:
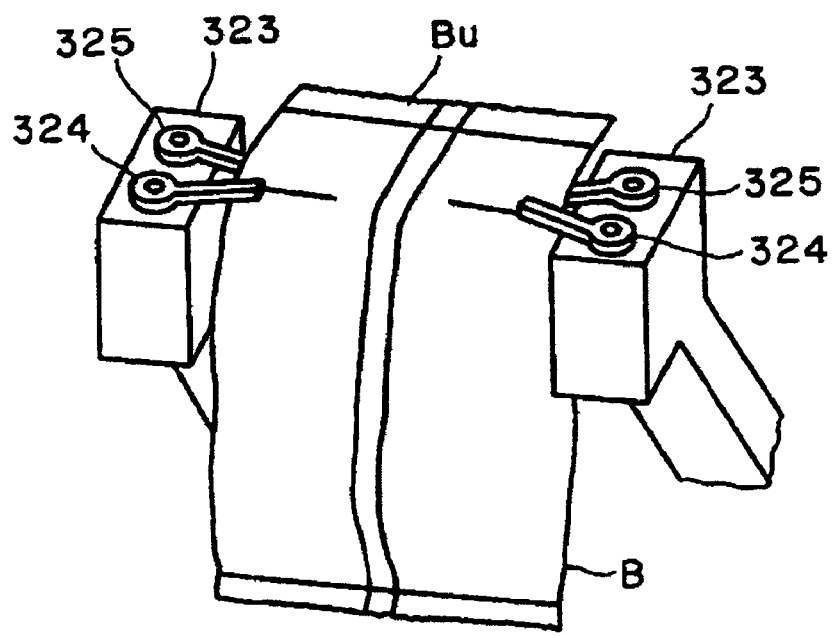

FIGS. 1 to 5 show one embodiment of the present invention. FIG. 1 shows a bag B manufactured by a bag manufacturing unit 1 being grasped by a transfer unit 3, and FIG. 2 shows the bag B being attached to a strip S by an attaching unit 2. FIG. 3 shows partial enlarged views of the attaching unit shown in FIGS. 1 and 2, in which (a) corresponds to FIG. 1 and (b) corresponds to FIG. 2. FIG. 4 shows a perspective view of the area around a retaining plate 24. FIG. 5 shows perspective views of grasping members 324, 325 that are included in the transfer unit 3.

General Overview of the Bag Manufacturing and Packaging Apparatus

As shown in FIGS. 1 and 2, the bag manufacturing and packaging apparatus that includes a strip tape mounting device according to the present invention has a bag manufacturing unit 1, an attaching unit 2, a transfer unit 3, and a strip transport unit 4. The bag manufacturing and packaging apparatus automatically manufactures bags B whose interiors are filled with articles with the bag manufacturing unit 1. Each bag B is then grasped by the transfer unit 3 and transferred to the attaching unit 2. As shown in FIG. 4, an attachment portion Ba that is in the upper end Bu of each bag B will be pressed onto a strip S that is drawn out from the strip transport unit 4.

Each of the bag manufacturing unit 1, the attaching unit 2, the transfer unit 3, and the strip transport unit 4 is operatively connected to a control unit, which is not shown in Figures. The control unit preferably includes a microcomputer with a control program that controls the various units connected thereto. The control unit can also include other conventional components such as an input interface circuit, an output interface circuit, and storage devices such as a ROM (Read Only Memory) device and a RAM (Random Access Memory) device. The control unit is capable of selectively controlling any of the units connected thereto in accordance with the control program. It will be apparent to those skilled in the art from this disclosure that the precise structure and algorithms for the control unit can be any combination of hardware and software that will carry out the functions of the present invention.

Bag Manufacturing Unit 1

The bag manufacturing unit 1 transports a sheet-like film while forming the sheet-like film into a tubular shape whose side surface and lower portion are sealed and which extends in a longitudinal direction. Then, articles are dropped from above into the interior of the film formed into a tubular shape, and the upper portion thereof is sealed with a heat sealing mechanism 11 and cut from the film to automatically manufacture a bag B. As shown in FIG. 1 or 2, the heat sealing mechanism 11 includes rotation members 111, an urging member 112, and sealing jaws 113, 114. The two rotation members 111 have the sealing jaws 113, 114 on both end portions thereof, and rotate around rotation support shafts 111a so as to be left-right symmetric. These members are supported by a frame that is not shown in the Figures.

As shown in FIG. 2, the sealing jaws 113, 114 meet at a point P1 and grasp the upper end of the bag B, maintain the bag B in the grasped state with the urging force of the urging member 112 while transferring the bag B downward. Then as shown in FIG. 1, the sealing jaws 113, 114 separate at a point P2 to discharge the bag B further downward. A heater and a cutter are provided in the sealing jaws 113, 114. The heater heat-seals the upper end of the bag B and the lower end of the subsequent bag. The cutter cuts off the bag B from the subsequent bag. Note that the rotation support shafts 111a are arranged to be slidable in the horizontal direction, and when the sealing jaws 113, 114 are positioned between P1 and P2, the rotation support shafts 111a will resist the urging force of the urging member 112 and move outward.

Attaching Unit 2

The attaching unit 2 includes a heater 21 and a clamp 22 that are supported by a frame not shown in the Figures. The heater 21 is a block in which a compression surface 21a that is formed on the upper surface of the block is heated to 200° C. In order for the strip S drawn out from the strip transport unit (described below) to smoothly pass over the compression surface 21a, the compression surface 21a is provided with an inclination that is tilted downward in the direction in which the strip S is advanced.

The clamp 22 is a lever that is pivotably supported by a rotation support shaft 22a, and a pushing surface 22b that pushes on the compression surface 21a of the heater 21 is formed on the free end of the clamp 22. The pushing surface 22b on the free end of the clamp 22 reciprocally moves between an open position shown in FIG. 1 or 2 (the dotted line) and a closed position that is shown in FIG. 2 (solid line). As shown in FIG. 3, when the clamp 22 is in the closed position, the strip S and the upper end Bu that is the attaching surface of the bag B will be interposed between the clamp 22 and the heater 21 and compressed together, and the strip S and the bag B will be fused (adhered) to each other by the heat of the heater 21.

A heater blocker 23 is disposed on the lower side of the heater 21. As shown in FIG. 3, the heater blocker 23 is constructed by installing a block plate 232 on the tip of an extensible rod 231a of an air cylinder 231. The heater blocker 23 pulls the strip S away from the heater 21 by periodically raising the strip S so that the strip S will not melt through. The heater blocker 23 is also supported by the frame of the attaching unit 2.

As shown in FIGS. 1 and 3(a), before the bag B is set in the attaching unit 2, the extensible rod 231a will elongate. This allows the block plate 232 to be raised in a direction in which the tip thereof will pull the strip S away from the compression surface 21a of the heater 21, and the strip S will be held in this position so that the strip S will not melt through due to the heat of the heater 21 until the bag B is set in the attaching unit 2. In addition, as shown in FIGS. 2 and 3(b), after the bag B is set in the attaching unit 2, the extensible rod 231a will retract. This allows the block plate 232 to withdraw downward, and allows the strip S to be moved from the raised state to a state in which the strip S is on the compression surface 21a of the heater 21 so that the strip S can be compressed to the bag B by the clamp 22.

As shown in FIGS. 2 and 3(b), the retaining plate 24 (retaining member) is installed on the block plate 232. The retaining plate 24 will come into contact with the bag B and support the bag B in a predetermined posture when the bag B is grasped by the transfer unit 3 and moves from the bag manufacturing unit 1 to the attaching unit 2 with the upper end Bu being set on the compression surface 21a. In this way, the retaining plate 24 allows the bag B to be transferred to the attaching unit 2 in the predetermined posture. The retaining plate 24 is a single metal plate that includes a support surface 24a that extends diagonally downward from the block plate 232. The support surface 24a supports a side portion Bs of the bag B that is below the grasping portion of the bag B grasped by the transfer unit 3. This suppresses swinging of the lower portion of the bag B caused by inertial force and the like produced when the bag B is transferred from the bag manufacturing unit 1 to the attaching unit 2.

The support surface 24a of the retaining plate 24 is inclined to match the diagonal downward direction (the left downward direction in FIG. 2) in which the bags B mounted to the strip S are to be discharged. In other words, the support surface 24a of the retaining plate 24 is at an angle of inclination that matches the direction in which the bags B mounted to the strip S are discharged, and thus allows the bags B attached to the strip S to be smoothly discharged. In addition, as shown in FIG. 4, the retaining plate 24 is curved in a direction perpendicular to the discharge direction (arrow A) of the bags B. Thus, the support surface 24a defines a trough shape that centers the bags B in the direction perpendicular to the discharge direction A and extends in the direction A in which the bags B are discharged. Furthermore, wall shaped guides 24c that interpose the support surface 24a from both lateral side of the discharge direction are formed on both sides of the support surface 24a and extend along the entire length of the support surface 24a.

Transfer Unit 3

As shown in FIG. 1, the transfer unit 3 grasps the bag B discharged from the bag manufacturing unit 1 and transfers the bag B to the attaching unit 2. Also as shown in FIG. 2, the transfer unit 3 sets the upper end Bu of the bag B in a position in which the upper end Bu can be compressed between the pressing surface 22b of the clamp 22 and the compression surface 21a of the heater 21. A pair of transfer units 3 is arranged on both sides from left to right of the bag manufacturing unit 1 and the attaching unit 2. The pair of transfer units 3 each includes a fixed support member 31 and a reciprocating transfer member 32.

Each of the left and right symmetrical fixed support members 31 is constructed from two rail members 311 that extend diagonally, and an upper support member 312 and a lower support member 313 that fixedly support the upper ends and the lower ends of the rail members 311. The exterior of each of the left and right symmetrical fixed support members 31 is covered with a cover C.

Each of the left and right symmetrical reciprocating transfer members 32 is composed of a slide member 321 that is slidably engaged with the rail members 311, an arm 322 whose one end is fixedly coupled to the slide member 321, a transfer member 323 that is fixedly coupled to the other end of the arm 322, and grasping members 324, 325 that are disposed on the transfer member 323. Each slide member 321 is reciprocally moved up and down with a drive mechanism not shown in the figures. Accordingly, each transfer member 323 reciprocally moves between the bag manufacturing unit 1 and the attaching unit 2.

Figure 6:
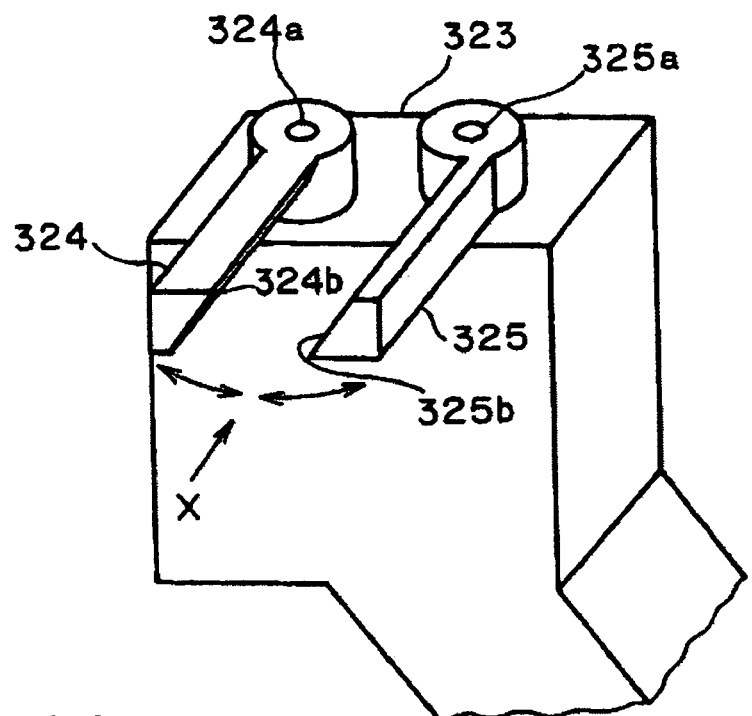
FIG. 6 show enlarged views of the grasping members in accordance with the embodiment of the present invention.
Figure 6:
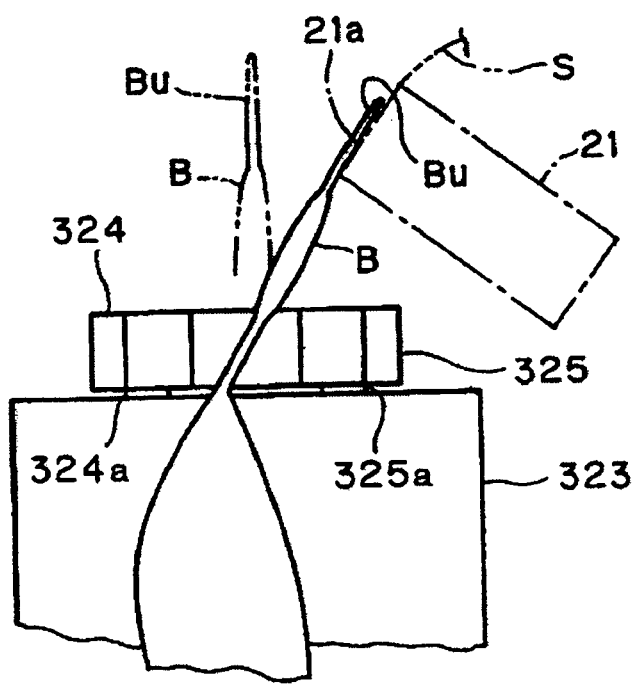

As shown in FIGS. 5 and 6, the grasping members 324, 325 are cylinder shaped members that are each rotatively supported by rotation support shafts 324a, 325a. The grasping members 324, 325 open and close in a left-right symmetrical manner as shown by the arrows in FIG. 5(a), by operation of a drive mechanism disposed in the transfer member 323. Then, as shown in FIG. 5(b), by rotating the grasping members 324, 325 in the close direction, the grasping members 324, 325 grasp, from both left-right sides of the bag, the vertical central portion, i.e., a portion of the bag B below the attaching surface of the bag B as the bag B is discharged from the bag manufacturing unit 1. Note that the grasping members 324, 325 are designed to be small so that the articles filled into the interior of the bag B will not be crushed thereby, and are also designed to grasp the bag B with a relatively small force so as to not puncture the bag B.

As shown in FIG. 6(a), grasping surfaces 324b, 325b that are formed on the grasping members 324, 325 and which grasp the bag B are formed into a flat shape, but are cut diagonally such that each grasping surface is provided with an inclination that matches the angle of inclination of the compression surface 21a. Thus, when the bag B is grasped with the grasping members 324, 325, the portion above the grasping portion is inclined with respect to the bag B. As a result, as shown in FIG. 6(b), when the bag B grasped by the grasping members 324, 325 is transferred to the attaching unit 2, the upper end Bu of the bag B to be attached to the strip S is placed onto the compression surface 21a of the heater 21.

Note that if the grasping surfaces 324b, 325b are perpendicular rather than inclined, the upper end of a bag B will be separated from the inclined compression surface 21a and will remain in the perpendicular state as shown by the dotted line in FIG. 6(b). Because of this, even if the bag B is supported by the retaining plate 24 so that the bag B does not swing, there is a strong possibility that problems will be produced such as attachment positions of the bag B and the strip S being misaligned and the upper portion of the bag B being crushed by the clamp 22.

Strip Transport Unit 4

The strip transport unit 4 includes a drive roller 41, an idle roller 42, a transport roller 43, a drive belt 44 that transmits the drive rotation of the drive roller 41 to the transport roller 43, a tension roller 45 that is pushed by the drive belt 44, and a pushing roller 46. The strip S is transported by the drive belt 44 and the rollers 43, 45, is guided by a guide member 47, and passes over the upper side of the compression surface 21a of the heater 21.

Operation of the Strip Tape Mounting Device of the Bag Manufacturing and Packaging Apparatus Next, the operation of the strip tape mounting device in accordance with the embodiment noted above will be described. First, each transfer member 323 moves to the bag manufacturing unit 1 as shown in FIG. 1, and grasps the bag B that is being discharged from the heat sealing mechanism 11, from both left-right sides of the bag B with the grasping members 324, 325. The grasping surfaces 324b, 325b of the grasping members are inclined, and thus the portion of the bag B above the grasping portions will also be inclined. Next, the transfer member 323 will move downward to the fixing member 2 as shown in FIG. 2. The grasping force of the grasping members 324, 325 is set to be relatively small, and thus the portion of the bag B below the grasping portion will swing during transport due to inertial force and the like.

However, when the inclined upper end Bu of the bag B is set on the upper surface of the strip S that passes over the compression surface 21a of the heater 21, the bag B will be supported by the support surface 24a so that the portion of the bag B below the grasping portion will not move. Thus, the upper end Bu above the grasping portion will not move and is aligned with respect to the compression surface 21a accurately. Finally, the clamp 22 is rotated downward, and the bag B and the strip S are compressed and fused to each other between the clamp 22 and the compression surface 21a. After that, the transfer member 323 will again move upward, and the same operation will be repeated.

Special Characteristics of the Strip Tape Mounting Device

The strip tape mounting device of the bag manufacturing and packaging apparatus of the present embodiment has the following special characteristics as a result of being constructed as described above.

The first special characteristic of the strip tape mounting device is that it includes the retaining plate 24 that retains the bag B in a fixed posture while being grasped by the transfer unit 3. Thus, swinging of the bag B due to the inertial force caused by the movement of the transfer unit 3 can be suppressed, and the upper end Bu of the bag B that will be the attachment surface will move very little with respect to the compression surface 21a of the heater 21. As a result, problems such as the attachment position of the bag B becoming misaligned with respect to the strip S, or the clamp 22 interfering with the upper end Bu of the bag B and crushing the bag B can be suppressed.

The second special characteristic of the strip tape mounting device is that the retaining plate 24 is installed on the block plate 23, which is part of the attaching unit 2. Accordingly, the structure in the vicinity of the transfer unit 3 can be simplified because the retaining plate 24 is disposed as part of the attaching unit 2 and not as part of the transfer unit 3. In addition, there will be extremely little possibility that the transport of the strip S will be hindered by the retaining plate 24 because the retaining plate 24 will be retracted together with the block plate 23.

The third special characteristic of the strip tape mounting device is that the retaining plate 24 is disposed below the attaching unit 2, and the retaining plate 24 will support the portion of the bag B below the portion that is grasped by the transfer unit 3. Thus, swinging of the bag B about the grasping portion due to inertial force caused by movement of the transfer unit 3 will be suppressed, and movement of the upper end Bu that will become the attachment surface will be more reliably suppressed. As a result, the attachment portion of the bag B can be stabilized with respect to the strip S, and interference of the clamp 22 with the upper end Bu of the bag B can be suppressed.

The fourth special characteristic of the strip tape mounting device is that the retaining plate 24 supports the bag B by contacting the lower portion of the bag B from the flank (from the side) while the bag B is grasped by the transfer unit 3. Accordingly, the retaining structure for the bag B can be achieved at a low cost because the bag B is brought into contact with only the retaining plate 24 installed in the attaching unit 2. In addition, there will be almost no concern regarding the hindrance to or failure of the smooth discharge of bags B.

The fifth special characteristic of the strip tape mounting device is that the support surface 24a of the retaining plate 24 is inclined to match the diagonally downward inclined direction in which bags B mounted to the strip S are discharged. This allows the bags B to be smoothly discharged.

The sixth special characteristic of the strip tape mounting device is that the support surface 24a of the retaining plate 24 is trough shaped, such that the bag B are centered in the direction perpendicular to the discharge direction of the bag B. Also, the trough shape of the support surface 24a extends in the direction in which the bags B are discharged. This allows the bags B to be centered within the retaining plate 24, and allows the bags B to be more smoothly discharged.

The seventh special characteristic of the strip tape mounting device is that the wall shaped guides 24c that interpose the support surface 24a from both flanks (both sides) thereof are formed on both sides of the support surface 24a of the retaining plate 24 and extend along the entire length of the support surface 24a. This allows the bags B to be more reliably centered within the retaining plate 24, and allows the bags B to be more smoothly discharged.

Modifications to the Aforementioned Embodiment

Figure 7:
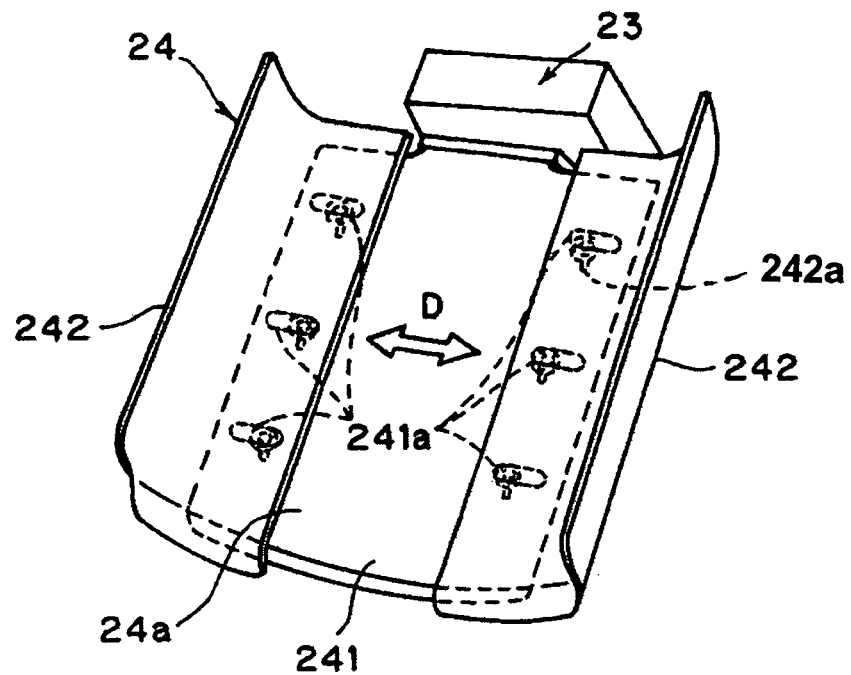
FIG. 7 show the retaining plate in accordance with alternate embodiments of the present invention.
Figure 7:
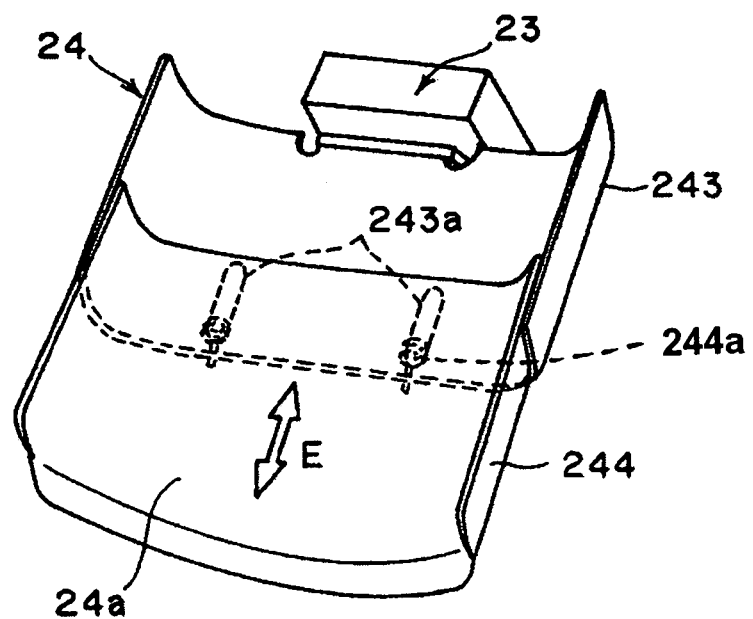
Figure 8:
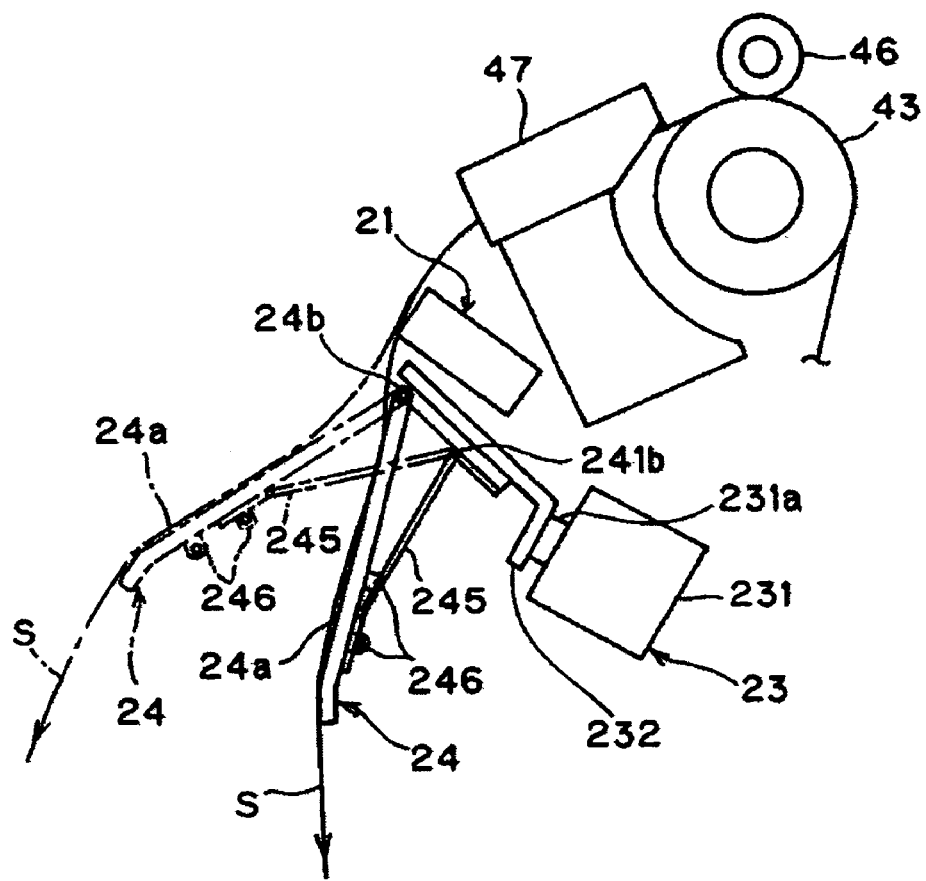
FIG. 8 shows the retaining plate in accordance with still another embodiment of the present invention.

Referring now to FIGS. 7, 8, a strip tape mounting device in accordance with alternative embodiments will now be explained. In view of the similarity between the first and alternative embodiments, the parts of the alternative embodiments that are identical to the parts of the first embodiment will be given the same reference numerals as the parts of the first embodiment. Moreover, the descriptions of the parts of the alternative embodiments that are identical to the parts of the first embodiment may be omitted for the sake of brevity.

(A) In the aforementioned embodiment, the retaining plate 24 is a plate member made of a single sheet of metal, but it may be formed from a resin or another material rather than metal. In addition, the retaining plate 24 is not limited to a single plate, but may be constructed from a plurality of plates. Furthermore, the dimensions of the retaining plate 24 may be made adjustable.

For example, as shown in FIG. 7(a), the retaining plate 24 includes a pair of side plates 242 and a base plate 241. The side plates 242 may be installed on both sides of the base plate 241 that extends diagonally downward from the block plate 23 so that the side plates 242 are slidable in the horizontal direction (arrow D direction) as nuts 242a that are attached to the back of the side plates 242 move within oval holes 241a, to thus make the support surface 24a adjustable.

Or, as shown in FIG. 7(b), the retaining plate 24 can have an upper plate 243 and a lower plate 244. The lower plate 244 is installed on the lower end side of the upper plate 243 that extends diagonally downward from the block plate 23 so that the lower plate 244 is slidable in the vertical direction (arrow E direction) as nuts 244a attached to the back of the lower plate 244 move within oval holes 243a, to thus make the support surface 24a adjustable.

Furthermore, both the width and the length of the support surface 24a may be made adjustable. Thus, by making the width and/or the length of the support surface adjustable, various sizes of bags can be accommodated.

(B) In the aforementioned embodiment, the angle of inclination of the support surface 24a is fixed, however the retaining plate 24 may be constructed so that its angle of inclination is adjustable. For example, as shown in FIG. 8, the retaining plate 24 and a support arm 245 are supported by the block plate 232 via hinges 24b, 241b, and the support arm 245 may allow the angle of inclination of the support surface 24a to be adjusted by engaging an engagement projection 246 formed in a plurality of positions on the rear surface of the retaining plate 24. This allows various sizes of bags to be accommodated, and allows the discharge direction of the bags to be changed.

Figure 9:
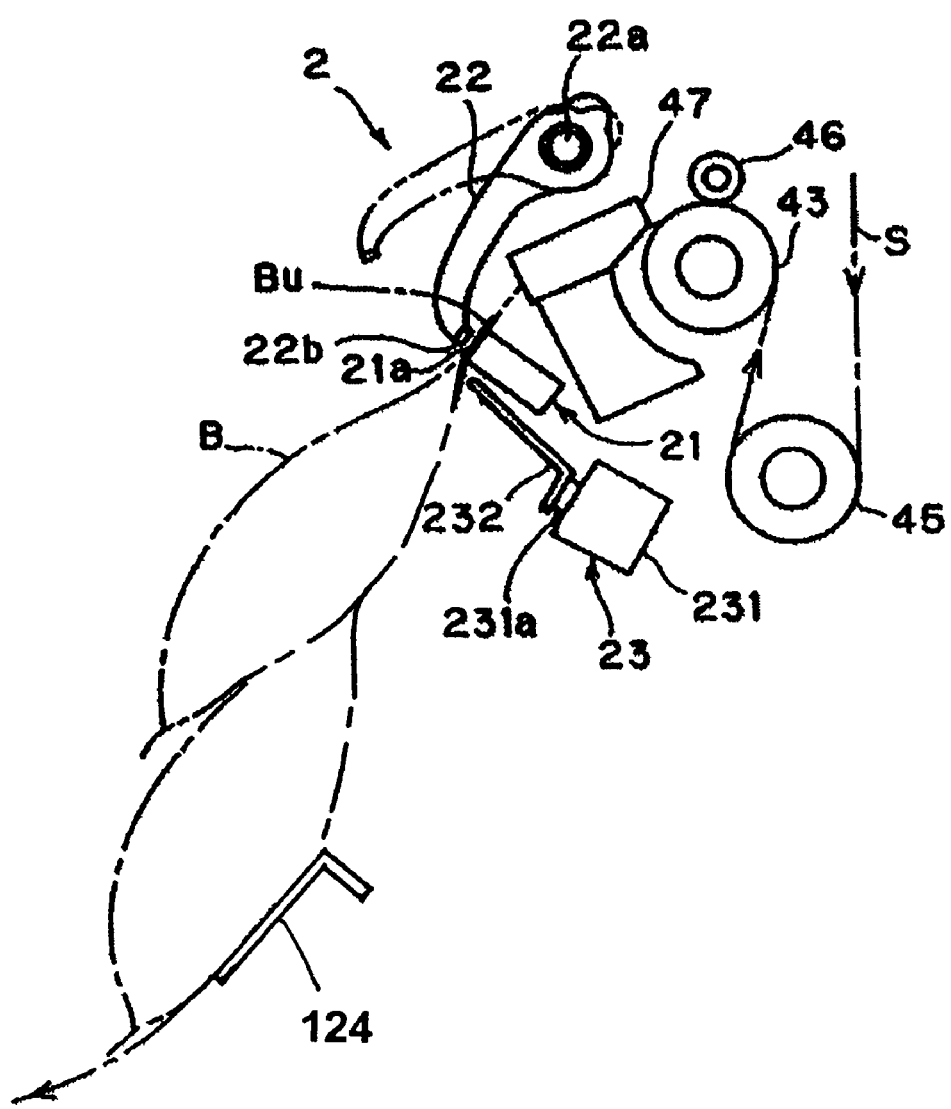
FIG. 9 shows a strip tape mounting device in accordance with still another embodiment of the present invention.

(C) In the aforementioned embodiment, the retaining plate 24 is contacted at its side by the bag B that is grasped by the retaining unit 3. However, as shown in FIG. 9, the retaining plate 124 supports an immediately preceding bag that has already been attached to the strip S, thereby supporting the bag that is being attached. Since the bag B that is being attached to the strip S comes into contact with this bag that has already been attached, the retaining plate 124 can support the bag B by supporting only the immediately preceding bag.

Figure 10:
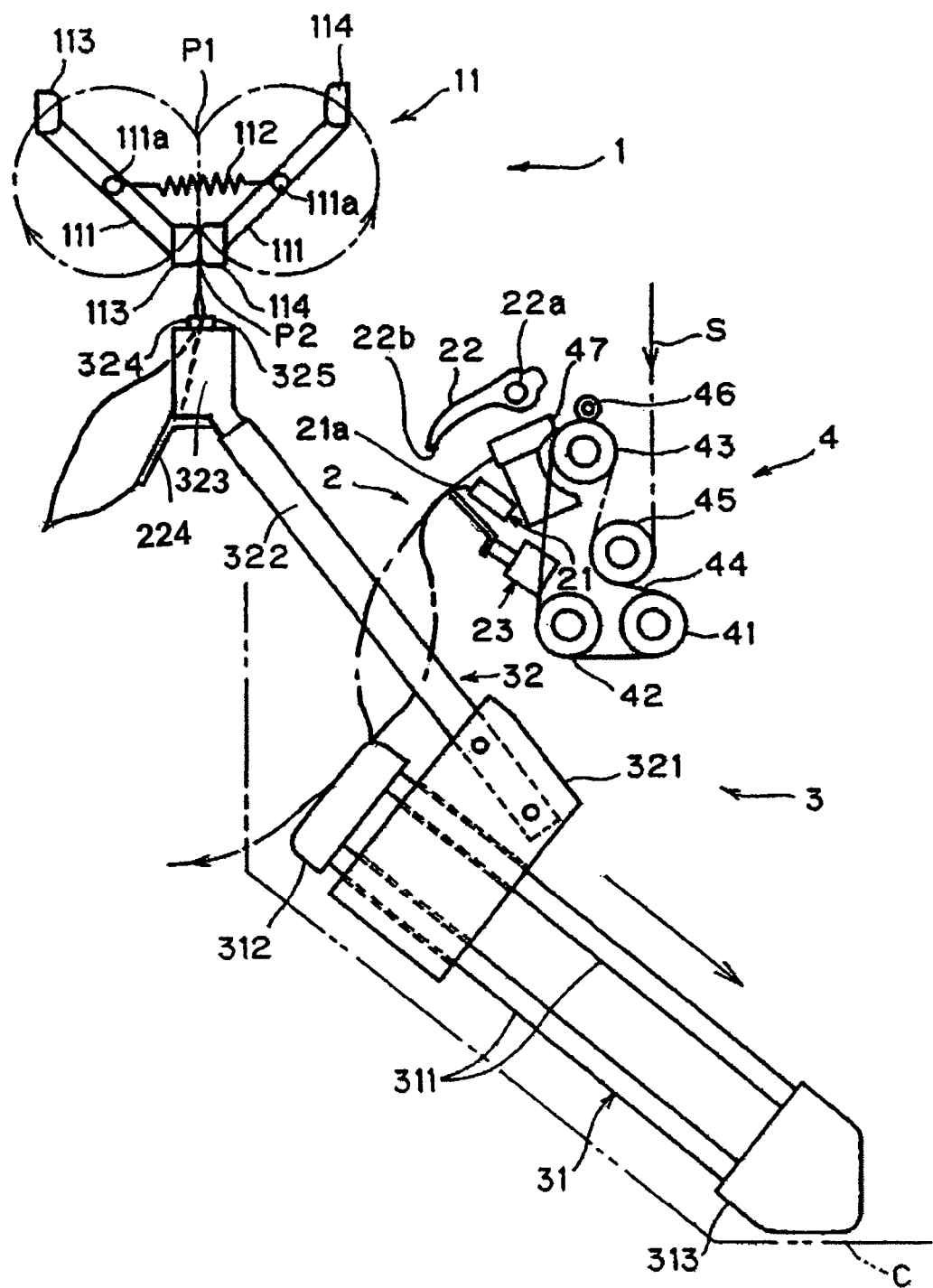
FIG. 10 shows a strip tape mounting device in accordance with still another embodiment of the present invention.

(D) In the aforementioned embodiment, the retaining plate 24 is installed on the block plate 23 provided within the attaching unit 2. However, the retaining plate may be fixedly supported to a component other than the block plate 23. For instance, the retaining plate may be disposed within the transfer unit 3 rather than the attaching unit 2, as seen in FIG. 10. In the arrangement of FIG. 10, the retaining plate 224 is attached to the transfer member 323.

(E) In the aforementioned embodiment, the bag B is supported by the retaining plate 24 that contacts the lower portion of the bag B. However, the present invention is not limited such arrangement, and the lower portion of the bag B may be fixedly held in place with a grasping member so that the bag B will not move.

(F) In addition, the strip tape mounting device of the present invention is not limited to the aforementioned embodiment, and various modifications thereof can of course be obtained that do not depart from the spirit of the present invention.

Because the present invention includes a retaining member that supports a bag in a fixed posture that is grasped by a transfer unit, swinging of the bag can be suppressed, and movement of the upper portion of the bag that will become the attachment portion can also be reduced. As a result, the attachment position of the bag with respect to the strip can be stabilized, and the present strip tape mounting device will be useful as a device used to manufacture strip bags.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

Moreover, terms that are expressed as "means-plus function" in the claims, if any, should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-174366. The entire disclosure of Japanese Patent Application No. 2003-174366 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A strip tape mounting device that receives a strip tape and bags filled with articles and manufactures a strip of bags, the strip tape mounting device comprising:
    an attaching mechanism that attaches to the strip tape by compression an attachment portion of the bag that is filled with articles;
    a transfer mechanism that receives the bag and transfers the bag to the attaching mechanism while holding a holding portion of the bag, which is adjacent to the attachment portion; and
    a retaining member that supports a portion of the bag other than the attachment portion or the holding portion to allow the bag to be received by the attaching mechanism in a predetermined posture and retain the bag in the predetermined posture while the attaching mechanism attaches the attachment portion to the strip tape.

2. The strip tape mounting device set forth in claim 1, wherein
    the retaining member is disposed on the attaching mechanism, and supports the bag in the predetermined posture when the bag is received by the attaching mechanism.

3. The strip tape mounting device set forth in claim 1, wherein
    the retaining member is disposed below the attaching mechanism, and supports the bag at a side portion that is adjacent to the holding portion of the bag.

4. The strip tape mounting device set forth in claim 1, wherein
    the retaining member further supports the bag that has already been attached to the strip tape.

5. The strip tape mounting device set forth in claim 1, wherein
    the retaining member is at an angle of inclination that corresponds to a discharge direction of the strip of bags.

6. The strip tape mounting device set forth in claim 5, wherein
    the retaining member has a support portion that supports the bag at its side portion, the support portion having a trough shape that extends in the discharge direction of the strip of bags.

7. The strip tape mounting device set forth in claim 6, wherein
    the retaining member further includes wall shaped guide portions that interpose the support portion from both sides.

8. The strip tape mounting device set forth in claim 6, wherein
    the retaining member further includes side plates that are slidably coupled to the support portion, such that a width of the retaining member is adjustable.

9. The strip tape mounting device set forth in claim 1, wherein
    the retaining member is supported via a hinge such that an angle of inclination of the retaining member is adjustable.

10. The strip tape mounting device set forth in claim 1, wherein
    the retaining member includes an upper plate and a lower plate, the lower plate being slidably coupled to the upper plate such that a length of the retaining member is adjustable in a discharge direction of the strip of bags.

11. The strip tape mounting device set forth in claim 1, wherein
    the retaining member is disposed on the transfer mechanism.

12. A bag manufacturing and packaging apparatus, comprising:
    a bag manufacturing mechanism that manufactures bags that are filled with articles; and
    a strip tape mounting device that receives bags manufactured by the bag manufacturing mechanism, receives a strip tape, and manufactures a strip of bags, including
        an attaching mechanism that attaches to the strip tape by compression an attachment portion of the bag that is filled with articles,
        a transfer mechanism that receives the bag and transfers the bag to the attaching mechanism while holding a holding portion of the bag, which is adjacent to the attachment portion, and
        a retaining member that supports a portion of the bag other than the attachment portion or the holding portion to allow the bag to be received by the attaching mechanism in a predetermined posture and retain the bag in the predetermined posture while the attaching mechanism attaches the attachment portion to the strip tape.

13. The bag manufacturing and packaging apparatus set forth in claim 12, wherein the retaining member is disposed on the attaching mechanism, and supports the bag in the predetermined posture when the bag is received by the attaching mechanism.

14. The bag manufacturing and packaging apparatus set forth in claim 12, wherein the retaining member is disposed below the attaching mechanism, and supports the bag at a side portion that is adjacent to the holding portion of the bag.

15. The bag manufacturing and packaging apparatus set forth in claim 12, wherein the retaining member further supports the bag that has already been attached to the strip tape.

16. The bag manufacturing and packaging apparatus set forth in claim 12, wherein the retaining member has a support portion that supports the bag at its side portion, the support portion having a trough shape that extends in a discharge direction of the strip of bags.

17. The bag manufacturing and packaging apparatus set forth in claim 16, wherein the retaining member further includes side plates that are slidably coupled to the support portion, such that a width of the retaining member is adjustable.

18. The bag manufacturing and packaging apparatus set forth in claim 12, wherein the retaining member is supported via a hinge such that an angle of inclination of the retaining member is adjustable.

19. The bag manufacturing and packaging apparatus set forth in claim 12, wherein the retaining member includes an upper plate and a lower plate, the lower plate being slidably coupled to the upper plate such that a length of the retaining member is adjustable in a discharge direction of the strip of bags.

20. The bag manufacturing and packaging apparatus set forth in claim 12, wherein the retaining member is disposed on the transfer mechanism.

* * * * *